(12) United States Patent
Ikäheimo et al.

(10) Patent No.: US 8,901,799 B2
(45) Date of Patent: Dec. 2, 2014

(54) ROTOR DISK AND ASSEMBLY METHOD

(75) Inventors: Jouni Ikäheimo, Kurikka (FI); Jere Kolehmainen, Merikaarto (FI)

(73) Assignee: ABB Technology AG, Zurich (CH)

(*) Notice: Subject to any disclaimer, the term of this patent is extended or adjusted under 35 U.S.C. 154(b) by 28 days.

(21) Appl. No.: 13/477,752

(22) Filed: May 22, 2012

(65) Prior Publication Data

US 2012/0293038 A1 Nov. 22, 2012

Related U.S. Application Data

(63) Continuation of application No. PCT/FI2010/050948, filed on Nov. 23, 2010.

(30) Foreign Application Priority Data

Nov. 23, 2009 (EP) .................................. 09176731

(51) Int. Cl.
*H02K 1/28* (2006.01)
*H02K 15/02* (2006.01)
*H02K 1/24* (2006.01)

(52) U.S. Cl.
CPC ................ *H02K 1/28* (2013.01); *H02K 15/028* (2013.01); *H02K 1/246* (2013.01)
USPC ...... 310/216.113; 310/216.121; 310/216.122; 310/216.133; 310/216.124

(58) Field of Classification Search
CPC ...................................................... H02K 1/28
USPC ................... 310/216.113–216.116, 216.121, 310/216.122, 216.124, 216.133; 29/525.01–525.15, 598
See application file for complete search history.

(56) References Cited

U.S. PATENT DOCUMENTS

| 4,361,953 | A | * | 12/1982 | Peachee .......................... 29/596 |
| 5,027,026 | A | * | 6/1991 | Mineta et al. .......... 310/216.127 |
| 6,072,256 | A | * | 6/2000 | Shon et al. ............... 310/156.53 |
| 6,177,750 | B1 | | 1/2001 | Tompkin |
| 2001/0022480 | A1 | * | 9/2001 | Johann et al. ................. 310/217 |
| 2007/0085437 | A1 | * | 4/2007 | Heideman et al. ....... 310/156.59 |
| 2009/0115281 | A1 | | 5/2009 | Kimura et al. |
| 2009/0127962 | A1 | * | 5/2009 | Ohyama et al. .......... 310/156.53 |

FOREIGN PATENT DOCUMENTS

| CN | 101116235 A | 1/2008 |
| JP | 2-036748 A | 2/1990 |
| JP | 6-048354 U | 6/1994 |
| JP | 8-163834 A | 6/1996 |

OTHER PUBLICATIONS

International Search Report (PCT/ISA/210) issued on Feb. 4, 2011, by the European Patent Office as the International Searching Authority for International Application No. PCT/FI2010/050948.

(Continued)

*Primary Examiner* — Terrance Kenerly
(74) *Attorney, Agent, or Firm* — Buchanan Ingersoll & Rooney PC

(57) ABSTRACT

A rotor disk for an electric motor including a shaft hole for receiving a shaft of the electric motor, a set of positioning holes around the shaft hole, each configured to receive a positioning pin. The shaft hole and the set of positioning holes are positioned in the rotor disk such that when the rotor disk is set to a rotated position with respect to another similar rotor disk, and the shaft and the positioning pins are penetrated to the respective holes of the two rotor disks, the disks cause a pressing force to the shaft.

15 Claims, 4 Drawing Sheets

(56) References Cited

OTHER PUBLICATIONS

Written Opinion (PCT/ISA/237) issued on Feb. 4, 2011, by the European Patent Office as the International Searching Authority for International Application No. PCT/FI2010/050948.

Office Action (Notification of the First Office Action) issued Dec. 25, 2013, by the Chinese Patent Office in corresponding Chinese Patent Application No. 201080052837.0, and an English Translation of the Office Action. (16 pages).

European Search Report for EP 09176731.9 dated Nov. 26, 2010.

* cited by examiner

ROTOR DISK AND ASSEMBLY METHOD

RELATED APPLICATIONS

This application is a continuation under 35 U.S.C. §120 of International Application PCT/FI2010/050948 filed on Nov. 23, 2010 and designating the U.S., which claims priority to European application 09176731.9 filed on Nov. 23, 2009 in Europe. The contents of which are hereby incorporated by reference in their entireties.

FIELD

The present disclosure relates to electric motors, such as the structure of a rotor disk of a motor and the assemblage of a motor shaft to a rotor of an electric motor.

BACKGROUND

Known motor shafts are attached to the rotor of an electric motor by applying heat fitting. The rotor includes a plurality of rotor disks, which have a shaft hole that has a slightly smaller diameter than the shaft. When heated, the shaft holes of the rotor disks expand allowing the disks to be positioned around the shaft. When the disks cool down to the same temperature with the shaft, a tight attachment is achieved as the disks shrink.

FIG. 1 shows an assembly of a shaft and a rotor disk in accordance with a known arrangement. As shown in FIG. 1, a fitting between a rotor disk 100 and a motor shaft 112 in a known implementation. As shown in FIG. 1, the motor shaft 112 is tightly placed into a shaft hole 110 of the rotor disk. The assembly of FIG. 1 shows a positioning hole 120 to which a positioning pin 140 has been placed.

Heat fitting is applicable to situations where the rotor material tolerates heating to a high temperature and consequent high mechanical stresses due to heat expansion. However, the process of heat fitting includes several steps and extra tensions remain in the rotor. Use of heat fitting is often not possible and other ways to provide the friction force between the shaft and the rotor disks should be considered.

Such other ways include cold fitting by pressing, which, however, is disadvantageous because the fit easily remains loose and the rotor disks may bend while pressed. In still another known method, the disks are mounted by using wedges fitted to wedge grooves in the disks, which also adds worksteps to the procedure. Gluing of the disks to the shaft has also been used, but longterm endurance of such a fitting is questionable.

SUMMARY

An exemplary rotor disk for an electric motor is disclosed, comprising: a shaft hole for receiving a shaft of the electric motor; and a set of positioning holes around the shaft hole, each configured to receive a positioning pin, wherein the shaft hole and the set of positioning holes are positioned in the rotor disk such that when the rotor disk is set to a rotated position with respect to another similar rotor disk, and the shaft and the positioning pins are penetrated to respective holes of the two rotor disks such that, the disks cause a pressing force to the shaft.

An exemplary method of mounting a motor shaft to a rotor of an electric motor is disclosed, comprising: providing a plurality of rotor disks having a shaft hole for receiving the shaft of the electric motor and a set of positioning holes, each provided for receiving a positioning pin, wherein the shaft hole and the set of positioning holes are positioned in the rotor disk such that there is only one mutual rotation position when the holes of the disks are fully overlapping with each other; rotating at least some of the rotor disks with respect to each other such that, in the plurality of the rotor disks, one of the shaft holes and the set of the positioning holes are overlapping with each other, and one of the shaft holes and the set of the positioning holes are only partially over-lapping with each other; inserting first the motor shaft to the shaft hole or the positioning pins into the positioning holes, depending on which of the holes in the disks are overlapping with each other, and inserting secondly the motor shaft to the shaft hole or the positioning pins to the positioning holes, depending on which of the holes in the disks are only partially overlapping with each other.

BRIEF DESCRIPTION OF THE DRAWINGS

In the following the disclosure will be described in greater detail by means of exemplary embodiments with reference to the attached drawings, in which.

DETAILED DESCRIPTION

Figure 1:
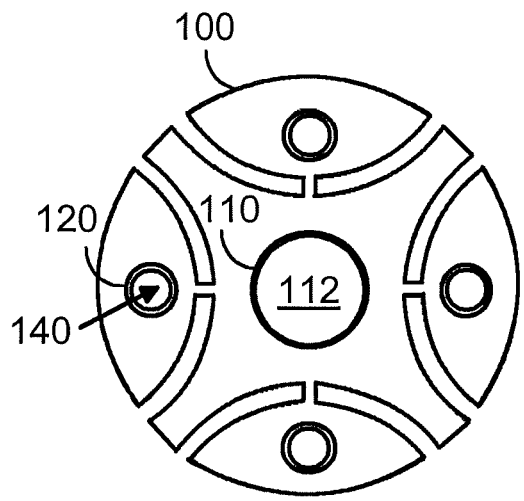
FIG. 1 shows an assembly of a shaft and a rotor disk in accordance with a known arrangement.

Exemplary embodiments of the present disclosure provide a method and an apparatus for implementing the method to alleviate the above disadvantages.

According to exemplary embodiments of the present disclosure, the motor shaft can be tightly mounted on the rotor of the electric motor.

The disclosed exemplary embodiments can be applied to reluctance or permanent magnet electric motors, for instance. The rotor of the electric motor can be formed of a plurality of rotor disks. Each rotor disk can have a hole for receiving a shaft of the motor. The shaft is cylindrical, that is the cross-section of the shaft is a circle. In addition to the shaft holes, each rotor disk can be provided with at least two positioning holes for receiving respective positioning pins. The task of the positioning pins is to align and keep the rotor disks in the same angular position with respect to each other, and to provide mechanical strength for a stack of rotor disks when stacked to form the rotor of the motor.

In the exemplary embodiments of the present disclosure, there is at least some asymmetry in the positions of the shaft hole and the positioning holes. There are three basic ways to provide this asymmetry. First, the shaft hole can be displaced from the central position of the disk and the positioning holes symmetrically positioned in the disk. Second, the shaft hole can be centralized in the disk but the positioning holes are positioned asymmetrically in the disk. That is, at least one of the positioning holes deviates from the symmetry defined by the other positioning holes. In the third way, the shaft hole is decentralized and also the positioning holes are asymmetrically placed such that there is asymmetry between the shaft hole and the positioning holes.

The mutual positioning of the shaft hole and the positioning holes can be implement in various exemplary arrangements. For example, in an embodiment, at least one positioning hole is at another distance from the can be of the disk than the other positioning holes.

In another exemplary embodiment, the positioning holes can form a plane-geometrical shape around the shaft hole. The plane-geometrical shape may be a line or a polygon. Expressed in this way, the center of the weight of the plane-geometrical shape differs from the center of the shaft hole.

When the rotor disks are stacked and the edges of the disks are aligned with each other, and at least some of the disks are rotated with respect to the other disks, the asymmetry in the positioning of the holes causes that at least some of the shaft holes and/or positioning holes are misaligned with respect to each other. That is, when the edges of the disks are aligned with each other and the stack of disks is seen from the end of the stack, the shaft holes and/or the positioning holes are not in alignment with each other in such disks that have been rotated with respect to each other. By rotation here is meant that the rotation angle is something else than a multiple of a full rotation, that is 0, 360, 720 degrees and so on. The rotation angle is however such that it aims to align as many holes of the disks as possible.

By way of example, we may consider two similar disks having 4 positioning holes. At 0 degrees, all holes of the two disks are fully aligned with each other. At the other interesting rotation angles, 90, 180 and 270 degrees, at least some of the holes are only partially overlapping with the respective holes in the other disk. In this context, by rotating disks into a rotated position means rotating one of the disks 90, 180 or 270 degrees with respect to the other disk.

If, for example, we consider two disks which are stacked, there is only one rotation position where the shaft hole and the positioning holes are aligned with each other. When either of the disks is rotated any angle from this single rotation position, at least one of the shaft holes and positioning holes in the two disks is in misalignment compared to each other. If one of the disks is rotated 180 degrees, the alignment of the shaft hole or the set of positioning holes causes the other one to become misaligned, that is, to overlap only partly with the respective hole(s) in the other disk.

Figure 2:
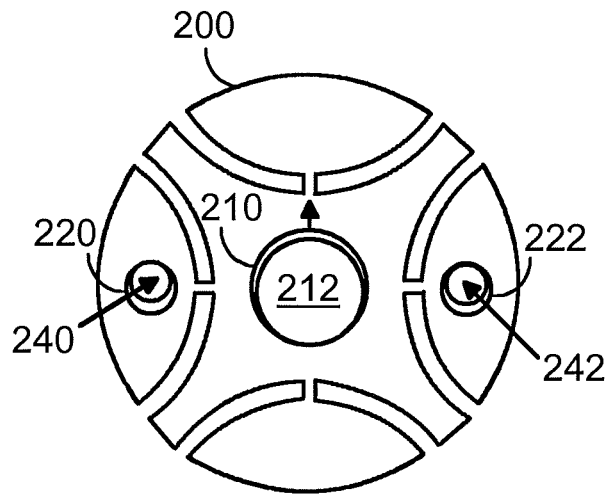
FIG. 2 shows a first assembly of a motor shaft and a rotor disk in accordance with an exemplary embodiment of the present disclosure.

FIG. 2 shows a first assembly of a motor shaft and a rotor disk in accordance with an exemplary embodiment of the present disclosure. FIG. 2 shows an exemplary embodiment where the shaft hole 210 in the disk is slightly decentralized. The displacement of the shaft hole from the center of the disk may be 0.1 to 0.5 mm, for instance. The displacement of the shaft hole may be vertical (y-direction), as in FIG. 2, where the shaft hole is slightly above the center of the disk as indicated by the arrow.

The diameter of the shaft 212 can be slightly smaller than the diameter of the hole 210. When the shaft is mounted in the hole, the shaft touches only a part of the circumference of the hole and some free space remains between the shaft and the upper inner edge of the hole.

In the rotor disk of FIG. 2, two positioning holes 220, 222 are provided. The positioning holes 220, 222 are symmetrically positioned in the disk, that is, the positioning holes are at equal distances from the center of the disk and on the same straight line with the center of the disk. The symmetry can be tested such that the disk is rotated around its center point an angle which is "360 degrees divided by the number of the positioning holes". If the positioning holes after the rotation match with the positions of the holes before the rotation, the positioning holes are symmetrically positioned in the disk. In the exemplary embodiment of FIG. 2, if the disk is rotated 180 degrees (360 degrees per 2) around the center point of the disk, the hole 222 moves exactly to the position of the hole 220 before the rotation, and vice versa.

As the positioning holes are symmetrically positioned, and the shaft hole is eccentrically positioned to the disk, the mutual positioning of the positioning holes with respect to the shaft hole is asymmetric. That is, in the example of FIG. 2 having two positioning holes 220 and 222, a straight line cannot be drawn via the centers of the positioning holes and the shaft hole.

The asymmetry can be tested such that the disk is rotated around the center point of the shaft hole 212 an angle which is "360 degrees divided by the number of the positioning holes". If there is asymmetry between the shaft hole 212 and the positioning holes 220, 222, at least one of the shaft hole and positioning holes 220, 222 ends up in a position, which is partly different from the positions before the rotation. In the example of FIG. 2, if the disk is rotated 180 degrees around the center of the disk, the shaft hole ends up partly in a different position than before the rotation. The partial overlapping is such that in the case of multiple stacked rotor disks where some of the disks are rotated, it is possible to insert the shaft through the partially overlapping shaft holes.

In FIG. 2, when the shaft 212 is mounted to the shaft hole 210 and the positioning pins 240, 242 are mounted to the respective positioning holes 220, 222, the edge of the positioning hole 210 exerts a force to the shaft from below, and the holes 220, 222 exert a force to the respective positioning pin from above. In this way, a tight assembly of the shaft 212 to the shaft hole 210 is obtained.

Figure 3:
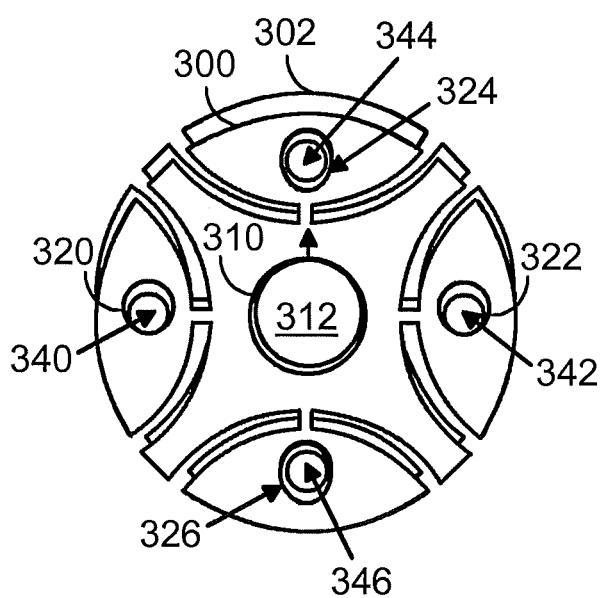
FIG. 3 shows a second assembly of a motor shaft and a stack of rotor disks in accordance with an exemplary embodiment of the present disclosure.

FIG. 3 shows a second assembly of a motor shaft and a stack of rotor disks in accordance with an exemplary embodiment of the present disclosure. FIG. 3 shows an embodiment where the assembling of a motor shaft 312 to a stack of rotor disks 300, 302 is shown from the end of the shaft 312. Practically, the rotor include from tens to hundreds of rotor disks. The rotor disks forming the rotor can be identical or at least most of the disks are identical. In-between the stack of rotor disks, there may occasionally be different disks to provide mechanical strength for the stack of disks, for example.

In the exemplary embodiment of FIG. 3, each rotor disk includes four positioning holes 320, 322, 324, 326. The positioning holes 320, 322 are circles whereas the positioning holes 324, 326 are elliptical, and might be also square, for instance. In the exemplary embodiment of FIG. 3, the shaft hole 310 is eccentrically positioned with respect to the disk. The positioning holes are symmetrically positioned to the disk. Thus, the positioning holes are asymmetrically positioned with respect to the eccentrically positioned shaft hole.

As shown in FIG. 3, the rotor disk 302 has been rotated 180 degrees with respect to the rotor disk 300 before mounting the shaft 312 to the disks 300, 302. Thus, when the disks are collected to a stack, the eccentric shaft holes in mutually rotated rotor disks are displaced from each other. When the shaft 312 is mounted to the shaft holes of the disks, the displacement of the shaft holes in the neighboring disks is doubled, which when seen from the end of the stack of disks the disks 300 and 302 are not in alignment with each other.

Figure 4:
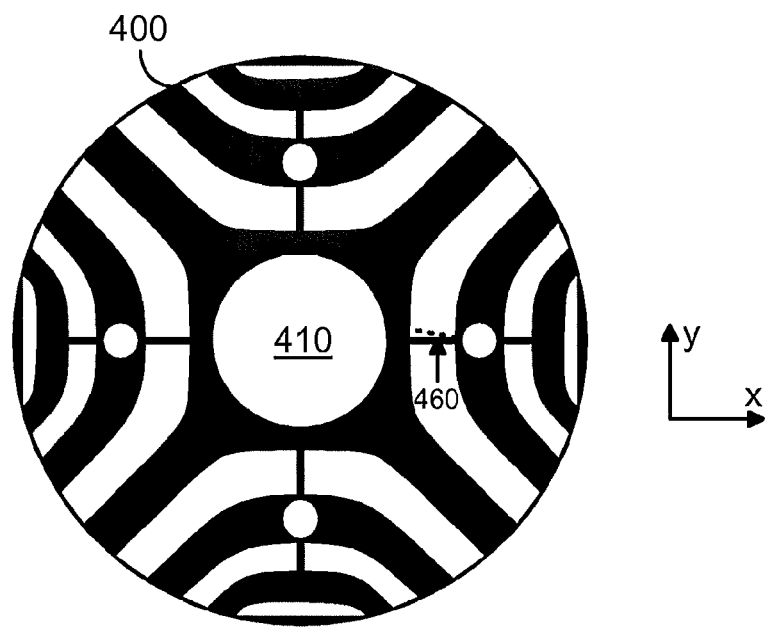
FIG. 4 shows an overview of a rotor disk in accordance with an exemplary embodiment of the present disclosure.

FIG. 4 shows an overview of a rotor disk in accordance with an exemplary embodiment of the present disclosure. In particular, FIG. 4 shows another embodiment of a rotor disk 400, which is suitable for use in a reluctance motor, for example.

Similarly to FIG. 3, the shaft hole 410 is displaced slightly upward in the y-direction. The positioning holes can be arranged symmetrically to the disk. The positioning holes on the x-axis are circles, whereas the positioning holes on the y-axis are ellipses.

As explained in conjunction with FIG. 3, when the shaft is mounted in the shaft hole and the positioning pins are mounted in the positioning holes, tension/pressing is formed between the shaft/positioning pin and the respective hole. In FIG. 3, this tension is made possible by the dimensioning of the holes, that is, the holes have sufficiently large diameters to allow the simultaneous mounting of the shaft and positioning pins to the rotor disk.

In another exemplary embodiment, the rotor disk may have some flexible element, which is configured to flex such that the mounting of the shaft and the positioning pins is possible. As an example of such a flexible element, FIG. 4 shows a neck 460 between the positioning hole on the x-axis and the shaft hole 410. When the positioning pins are placed into the positioning holes, and the shaft is to be mounted to the shaft hole, the mounting force of the shaft urges the disk to move upwards in the y-direction. This movement is made possible by the flexible element 460, which may bend and stretch as depicted by the dashed line.

FIGS. 5A to 5D show various configurations of rotor disks in accordance with exemplary embodiments of the present disclosure. FIGS. 5A to 5D show possible constellations between the shaft hole and the positioning holes. In all these exemplary embodiments, the shaft holes 500A to 500D are centrally positioned to the disk. A common feature of these embodiments and other embodiments is that the shaft hole and the set of positioning holes are positioned in the rotor disk such that when the rotor disk is set to a rotated position with respect to another similar rotor disk, and the shaft and the positioning pins are penetrated to the respective holes of the two rotor disks, the disks cause a pressing force to the shaft.

Figures 5A, 5B:
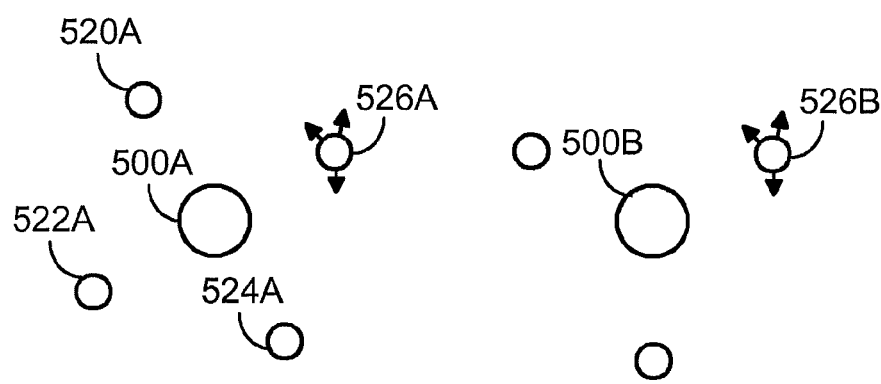
FIGS. 5A to 5D show various configurations of rotor disks in accordance with exemplary embodiments of the present disclosure.

Regarding an exemplary single disk, the holes are positioned such that rotationally the disk is somewhat in imbalance. In FIG. 5A, the positioning holes 520A to 524A are symmetrically positioned with respect to the shaft hole 500A. That is, if the disk is rotated 90 degrees counter-clockwise around the shaft hole 500A, the positioning hole 520A lands to the previous position (before the rotation) of the positioning hole 522A and the positioning hole 522A lands to the previous position of the hole 524A. FIG. 5A also shows a fourth positioning hole 526A. For example, the positioning hole 526A is shown in the symmetry position and the arrows depict that the hole is, in practice, positioned away from this symmetry position. When the hole 526A is moved away from this symmetry position, the positioning between the shaft hole 500A and the set of positioning holes 522A to 526A becomes asymmetric. When a plane-geometric shape, a polygon in this case, is drawn via the positioning holes, the center of weight of the polygon is located away from the center of the shaft hole.

The displacement of the positioning hole 526A from its symmetry position is small. In the above-mentioned example, if the disk is rotated 90 degrees counter-clockwise, the hole 524A ends up in a position that is partly overlapping with the position of the hole 526A before the rotation. The partial overlapping can be over 50% of the area of the holes.

FIG. 5B shows an exemplary embodiment, where the disk includes an odd number of, that is, three positioning holes. In the case of three holes, the symmetry is defined by the distance and the angle. In a symmetrical constellation of positioning holes, each positioning hole is at the same distance from the shaft hole and the angles between the straight lines via the center of the shaft hole and the positioning holes are 120 degrees. In an asymmetric constellation, at least one of the positioning holes is at a different distance when compared to the other holes and/or at least one angle between two lines to two neighboring holes deviates from 120 degrees.

In FIG. 5B, the positioning hole 526B is positioned away from the symmetry position defined by the other two positioning holes and the shaft hole 500B. Another way to look at FIG. 5B, is that the positioning hole 526B is positioned into the symmetry position and the two other positioning holes are positioned into asymmetric positions such that the overall positioning of the shaft hole 500B and the three positioning holes is at least partially asymmetric.

Figures 5C, 5D:
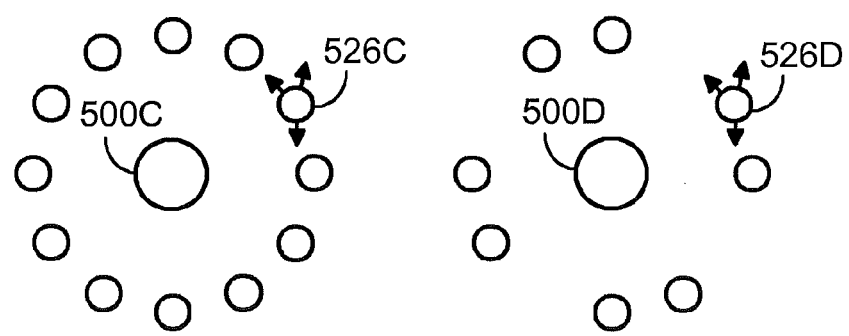

FIG. 5C shows an embodiment with 12 positioning holes. Only the hole 526C is positioned away from the symmetry position defined by the 11 other holes and the shaft hole 500C. Considering this example and two similar rotor disks, there is only one rotation angle of the disks where all the holes are fully aligned with each other. When the two disks are put to some other rotated position, at least some of the mutual holes of the disks are only partly overlapping with each other. By a "rotated position", it is meant any rotation angle being 360/n, where n is an integer above 1 but less than the number of holes.

FIG. 5D shows an exemplary embodiment where the other positioning holes except 526D are positioned symmetrically with respect to the shaft hole. The displacement of the positioning hole 526D from the symmetry position causes the overall constellation between the shaft hole and the eight positioning holes to become asymmetric.

In each of FIGS. 5A to 5D, the positioning holes may be combined with the neighboring positioning holes such that a polygon is formed. A center of weight of the polygon can be determined. When one of the positioning holes, such as the hole 526A in FIG. 5A, is displaced from the symmetry position, the center of weight of the polygon deviates from the center of the shaft hole 500A.

Figures 6A, 6B:
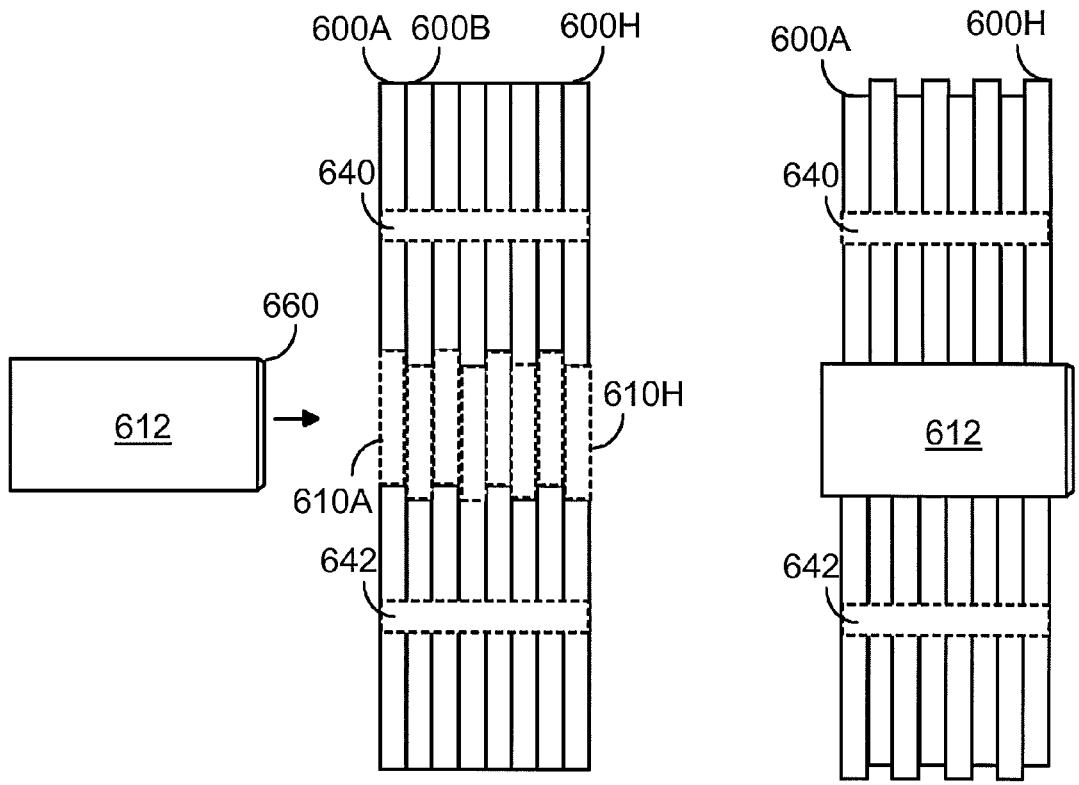
FIG. 6A shows a method of assembling of a motor shaft to a stack of disks before mounting the shaft on the disks in accordance with an exemplary embodiment of the present disclosure.
FIG. 6B shows a method of assembling of a motor shaft to a stack of disks when the shaft has been mounted on the disks in accordance with an exemplary embodiment of the present disclosure.

FIGS. 6A and 6B illustrate the method of mounting the motor shaft and rotor on each other.

FIG. 6A shows a method of assembling of a motor shaft to a stack of disks before mounting the shaft on the disks in accordance with an exemplary embodiment of the present disclosure. In FIG. 6A, several similar rotor disks 600A to 600H have been stacked. In the rotor disks 600A to 600H, the shaft holes 610A to 610H are eccentrically positioned. However, the positioning holes for the positioning pins 640, 642 are symmetrically positioned to the disks. Due to the eccentricity of the shaft hole and the symmetrical positioning of the positioning holes to the disk, the mutual positioning of the shaft hole and the positioning holes is asymmetric. When stacking the disk, at least some of the disks are rotated with respect to each other. Due to the rotation, in the example of FIG. 6A, the shaft holes 610A to 610H are partly in misalignment with each other. In FIG. 6A, the odd (first, third, fifth, seventh) disks are rotated 180 degrees with respect to the even (second, fourth, sixth, eighth) disks. For instance, the disks 600A and 600H are rotated 180 degrees with respect to each other such that the shaft holes 610A and 610H are in misalignment with each other.

In FIG. 6A, showing the situation before entering the shaft 612 to the shaft holes 610A to 610H, the positioning pins 640, 642 are put into the positioning holes of the disks. The positioning holes are symmetrically positioned in the disk and, thus, when the outer edges of the disks are aligned with each other, the positioning holes in different disks are aligned with other and it is possible to insert the positioning pins practically without any force through the positioning holes. Each disk may include at least two positioning holes for the positioning pins. If there is an even number of positioning holes, pairs of positioning holes are formed, wherein the holes are substantially opposite to each other on the different sides of the disk center.

When the positioning pins have been positioned into the positioning holes, the inserting of the shaft into the shaft holes may begin. The head 660 of the shaft 612 may be formed such that there is a slide, which pushes the odd disks downward and even disks upwards.

FIG. 6B shows a method of assembling of a motor shaft to a stack of disks when the shaft has been mounted on the disks in accordance with an exemplary embodiment of the present disclosure. FIG. 6B shows a situation, where the shaft 612 has been pressed to the shaft holes of the disks 600A to 600H. The displacement of the disks can be seen in that the odd disks have moved slightly downward and the even disks have moved slightly upward. In the end, the outer edges of the rotor disks 600A to 600H are not in alignment with each other. By the help of the positioning pins 640, 642, the shaft hole in each disk exerts a force to the shaft to fasten it tightly such that the rotation of the shaft with respect to the rotor is prevented.

Figure 7:
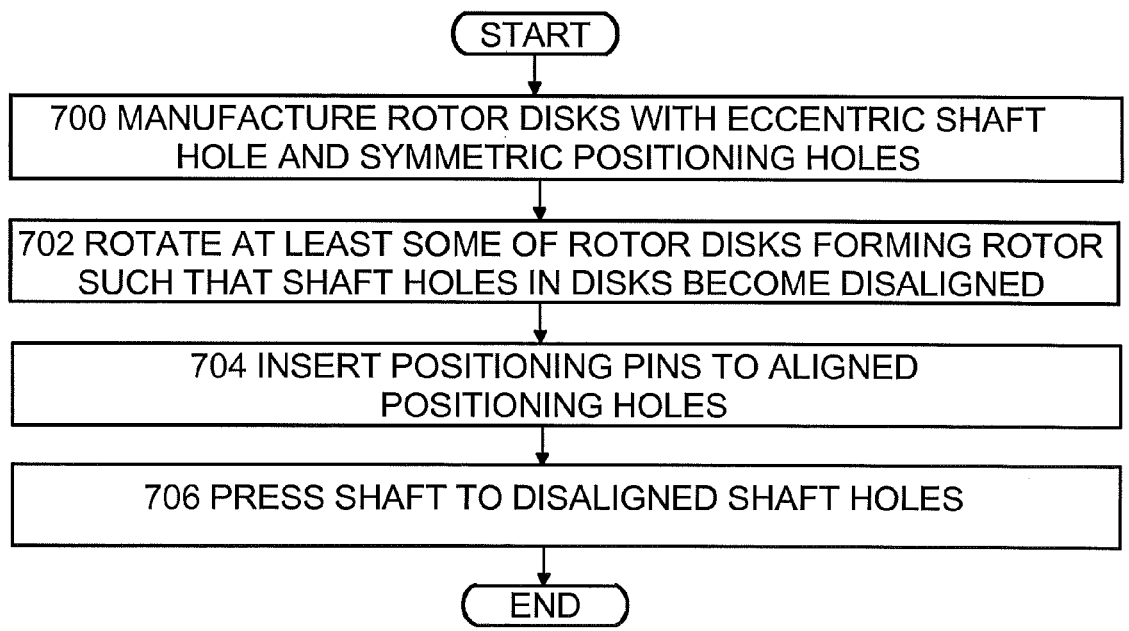
FIG. 7 is a flowchart of a first method of assembling a motor shaft to a rotor in accordance with an exemplary embodiment of the present disclosure.

FIG. 7 shows an embodiment of a method according to the disclosure. The method relates to mounting of a motor shaft on a rotor of an electric motor. FIG. 7 shows an embodiment of a method according to the disclosure. The method relates to mounting of a motor shaft on a rotor of an electric motor.

The rotor disks that are used in the embodiment of FIG. 7 are such that the disks include an eccentrically positioned shaft hole for the motor shaft having a circular cross-section. The disks include two or more positioning holes for the positioning pins, which in the embodiment of FIG. 7 are positioned symmetrically to the disk. As the shaft hole is eccentrically and the positioning holes are symmetrically positioned with respect to the disk, they are positioned mutually asymmetrically. The asymmetry can be tested by rotating the disk around the center point of the shaft hole at an angle which is "360 degrees divided by the number of the positioning holes", the constellation of the positioning holes around the shaft hole differing from the constellation before the rotation. That is, when two similar disks are put to a rotated position with respect to each other, at least some of the holes are only partly overlapping with the respective holes in the other disk.

In step 702, at least some of the rotor disks forming the rotor are rotated with respect to the other rotor disks such that the shaft holes in the rotor disks are in misalignment when the positioning holes are aligned to each other. In the case of two positioning holes, the mutual rotation of the disks is 180 degrees. In the case of four positioning holes, the rotation angle may be 90 or 180 degrees, and so on. The mutual rotation of the disks may be such that every other disk is rotated. Alternatively, a sub-stack of disks can be rotated when compared to a neighboring sub-stack. For example, in a stack of 50 disks, a sub-stack of five disks may have the same rotation, the next sub-stack of five disks another rotation, and so on. The outcome of 702 is that at least in some disks the shaft holes in the stack of disks are not in alignment with the shaft holes in the neighboring disks when the disks are otherwise aligned with each other.

In step 704, the positioning pins are inserted/protruded to the positioning holes. In this exemplary embodiment, the positioning holes are aligned with each other, as the positioning holes are symmetrically positioned to the disks and the disks are aligned with each other such that the positioning holes of the neighboring disks overlap.

In step 706, the motor shaft is pressed to the shaft holes of the disks. As the shaft holes in the disks are not in alignment with each other, significant force may be needed in this step. The motor shaft may be pressed through the shaft holes of the disks by using a hydraulic press, for instance. The end of the motor shaft may have a bevelling such as to ease the insertion of the shaft to the disks. At the end of 706, the shaft holes of the rotor disks are aligned to each other but the outer edges of the rotor disks are in misalignment with each other, depending on how the disks were rotated with respect to each other in step 702.

Figure 8:
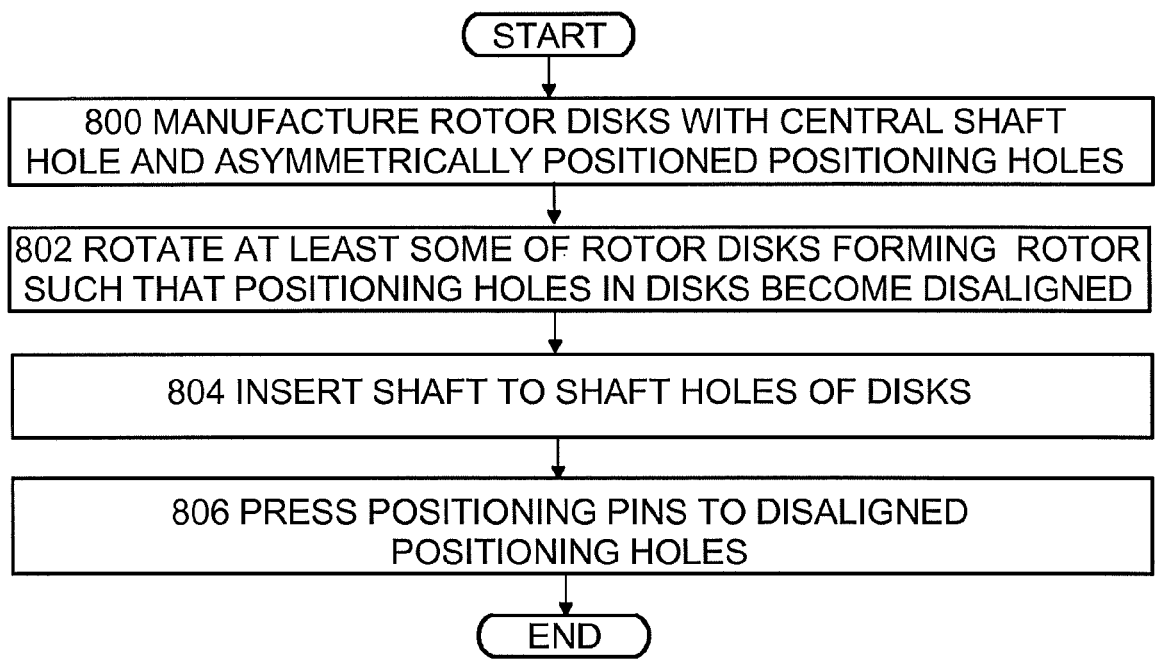
FIG. 8 is a flowchart of a second method of assembling a motor shaft to a rotor in accordance with an exemplary embodiment of the present disclosure.

FIG. 8 is a flowchart of a second method of assembling a motor shaft to a rotor in accordance with an exemplary embodiment. In step 800, rotor disks having a centrally placed shaft hole for a cylindrical shaft, and asymmetrically positioned positioning holes for positioning pins, are manufactured. As shown in the examples of FIGS. 5A to 5D, for instance, the asymmetry of the mutual positioning of the shaft hole and the positioning holes means in this context that at least one of the positioning holes is in an asymmetric position when compared to the other positioning holes and the shaft hole.

In step 802, at least some of the rotor disks are rotated around the central shaft hole such that the positioning holes in at least some neighboring disks are not fully overlapping with each other. In the case of two positioning holes, the rotation can be 180 degrees (360/2), in the case of three positioning holes the rotation can be 120 (360/3) or 240 (2*360/3) degrees, and so on.

In step 804, the shaft is inserted to the shaft holes of the disks. As the shaft holes are aligned in this step, no significant force is needed.

It is understood that steps 802 and 804 may also be carried out in such an order that the disks are first put onto the shaft and the rotation of the disks with respect to each other is carried out when the shaft is already in the shaft holes of the disks.

In step 806, the positioning pins are pressed to the positioning holes that are at least partially misaligned to each other. A hydraulic press may be used for this purpose.

In another exemplary embodiment of the present disclosure, the shaft hole in the rotor disk is arranged eccentrically, that is, the shaft hole is not exactly in the center of the disk. The displacement of the shaft hole from the center of the disk may be 0.2 to 0.4 mm, for instance. In an embodiment, the positioning holes are positioned symmetrically to the disk, and thus the mutual positioning of the shaft hole and the positioning holes is asymmetric. The center of weight of the positioning holes is thus displaced from the center of weight of the shaft hole.

In another embodiment, the shaft hole is arranged centrally to the rotor disk, and the set of positioning holes is arranged asymmetrically with respect to the centrally arranged shaft hole, whereby the center of weight of a polygon formed by the positioning holes differs from the center of the shaft hole.

As the set of positioning holes is arranged asymmetrically with respect to the centrally placed shaft hole, this means that the set of positioning holes is also arranged asymmetrically with respect to the rotor disk. By asymmetry is meant that at least one positioning hole in the set of positioning holes is arranged asymmetrically with respect to the other holes. That is, if there are two holes, these holes are not arranged symmetrically with respect to the shaft hole. If there are three holes, it may be that two of the holes are symmetrically arranged to the shaft hole but the third hole is not symmetrically arranged with the two other ones. Alternatively, all three holes are asymmetrically arranged, that is there is no symmetry between any of the holes and the shaft hole. The number of positioning holes may be any number higher than one.

In a further exemplary embodiment, the shaft hole is arranged eccentrically, and the set of positioning holes is arranged asymmetrically with respect to the rotor disk.

In an exemplary embodiment disclosed herein, the rotor disk is configured to flex when the shaft is projected into the shaft hole or when a positioning pin is inserted into the positioning hole. When the positioning pins are in the positioning holes and the motor shaft is pressed to the shaft holes of the rotor, the disk flexes. The flexing of the disk may be provided by a flexing element of the disk.

The asymmetry with respect to the shaft hole of the positioning holes may be defined such that when the disk is rotated around the center of the shaft hole 360 degrees divided by the number of positioning holes, the position of the shaft hole and/or the position of at least one positioning hole is incongruent with the position of the hole before the rotation. That is, in the case of two holes, for instance, the rotation angle is 180 degrees, with four holes 90 degrees, and so on. When the rotation has been performed, there is at least one hole in the set of positioning holes, which does not fully match with the positions of the positioning holes before the rotation.

The asymmetry may also be defined such that the center of weight of a planar geometrical shape formed by the positioning holes differs from the center of the shaft hole.

Functionally, the asymmetry can be defined such that the shaft hole and the set of positioning holes are positioned in the rotor disk such that when the rotor disk is set to a rotated position with respect to another similar rotor disk, and the shaft and the positioning pins are penetrated to the respective holes of the two rotor disks, the disks cause a pressing force to the shaft. The pressing force is caused by the inner edges of the shaft holes. Mutually rotated disks cause substantially opposite pressing forces to the shaft.

A rotor of the electric motor can include a plurality of rotor disks. The mounting of the shaft to the stack of rotor disks may be carried out in two alternative ways. In a first exemplary embodiment, the positioning pins are mounted first. In this embodiment, when the positioning pins have been mounted to the disks, the shaft holes of the rotor disks are in misalignment with each other. When the shaft is pressed to the misaligned shaft holes, each disk exerts a force towards the center of the shaft to mount the shaft tightly to the rotor. In another exemplary embodiment, the shaft is mounted first. In this embodiment, the positioning holes are somewhat misaligned with each other and the tight mounting of the shaft and rotor is obtained by pressing the positioning pins to misaligned positioning holes.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotor disk for an electric motor comprising:
   a shaft hole for receiving a shaft of the electric motor; and
   a set of positioning holes around the shaft hole, each configured to receive a positioning pin,
   wherein the shaft hole is arranged centrally to the rotor disk, the shaft hole and the set of positioning holes are positioned in the rotor disk such that when the rotor disk is set to a rotated position with respect to another similar rotor disk, and the shaft and the positioning pins are penetrated to respective holes of the two rotor disks, the disks cause a pressing force to the shaft, and
   wherein the set of positioning holes form a plane-geometrical shape whose center of weight differs from a center of the shaft hole wherein the shaft hole and the set of positioning holes are arranged asymmetrically with respect to each other; and
   wherein the set of positioning holes is arranged asymmetrically with respect to the centrally arranged shaft hole.

2. The rotor disk according to claim 1, wherein the center of weight of a polygon drawn via the positioning holes deviates from the center of the shaft hole.

3. An electric motor, wherein the electric motor comprises:
   a plurality of rotor disks according to claim 2, wherein at least two of the rotor disks are set to a rotated position with respect to the other rotor disks when the shaft and the positioning pins are mounted to the electric motor such that the rotor disks apply a pressing force to the shaft.

4. The electric motor according to claim 3, wherein the electric motor comprises:
   a shaft having a circular cross-section, wherein a diameter of the cross-section of the shaft is smaller than diameters of the shaft holes in the plurality of the rotor disks when at the same temperature.

5. The rotor disk according to claim 1, wherein the set of positioning holes and the shaft hole are arranged with respect to each other such that if two similar rotor disks are aligned with each other and one of the disks is rotated 360 degrees divided by the number of positioning holes, at least one of the shaft hole and the positioning holes is only partly overlapping with the respective hole in the other rotor disk.

6. The rotor disk according to claim 1, wherein the mutually rotated disks are configured to exert substantially opposite pressing forces to the shaft.

7. The rotor disk according to claim 1, wherein the rotor disk is configured to flex when the shaft is inserted into the shaft hole or when a positioning pin is inserted into the positioning hole.

8. The rotor disk according to claim 1, wherein the shaft hole is a circle for receiving a shaft having a circular cross-section.

9. An electric motor, wherein the electric motor comprises:
   a plurality of rotor disks according to claim 1, wherein at least two of the rotor disks are set to a rotated position with respect to the other rotor disks when the shaft and the positioning pins are mounted to the electric motor such that the rotor disks apply a pressing force to the shaft.

10. The electric motor according to claim 9, wherein the electric motor comprises:

a shaft having a circular cross-section, wherein a diameter of the cross-section of the shaft is smaller than diameters of the shaft holes in the plurality of the rotor disks when at the same temperature.

11. An electric motor, wherein the electric motor comprises:
a plurality of rotor disks according to claim 1, wherein at least two of the rotor disks are set to a rotated position with respect to the other rotor disks when the shaft and the positioning pins are mounted to the electric motor such that the rotor disks apply a pressing force to the shaft.

12. The electric motor according to claim 11, wherein the electric motor comprises:
a shaft having a circular cross-section, wherein a diameter of the cross-section of the shaft is smaller than diameters of the shaft holes in the plurality of the rotor disks when at the same temperature.

13. A method of mounting a motor shaft to a rotor of an electric motor, comprising:
providing a plurality of rotor disks having a shaft hole for receiving the shaft of the electric motor and a set of positioning holes, each provided for receiving a positioning pin, wherein the shaft hole and the set of positioning holes are positioned in the rotor disk such that there is only one mutual rotation position when the holes of the disks are fully overlapping with each other;
rotating at least some of the rotor disks with respect to each other such that, in the plurality of the rotor disks, one of the shaft holes and the set of the positioning holes are overlapping with each other, and one of the shaft holes and the set of the positioning holes are only partially over-lapping with each other;
inserting first the motor shaft to the shaft hole or the positioning pins into the positioning holes, depending on which of the holes in the disks are overlapping with each other, and
inserting secondly the motor shaft to the shaft hole or the positioning pins to the positioning holes, depending on which of the holes in the disks are only partially overlapping with each other.

14. The method of claim 13, comprising:
providing a plurality of rotor disks having an eccentrically positioned shaft hole, and arranging a set of positioning holes arranged symmetrically to the rotor disk;
rotating at least some of the rotor disks with respect to each other such that the shaft holes are only partially overlapping with each other and the symmetrically positioned positioning holes are overlapping with each other;
inserting the positioning pins into the positioning holes of the plurality of the rotor disks; and
pressing the motor shaft to the shaft holes of the rotor disks.

15. The method of claim 13, comprising:
providing a plurality of rotor disks having a centrally positioned shaft hole, and a set of positioning holes arranged at least partially asymmetrically with respect to the centrally arranged shaft hole;
rotating at least some of the rotor disks with respect to each other such that the positioning holes only partially overlap with each other; and
inserting the motor shaft into the shaft holes of the plurality of the rotor disks; and
pressing the positioning pins to the positioning holes of the rotor disks when the motor shaft has been inserted into the shaft holes of the rotor disks.

* * * * *